Patented Oct. 10, 1922.

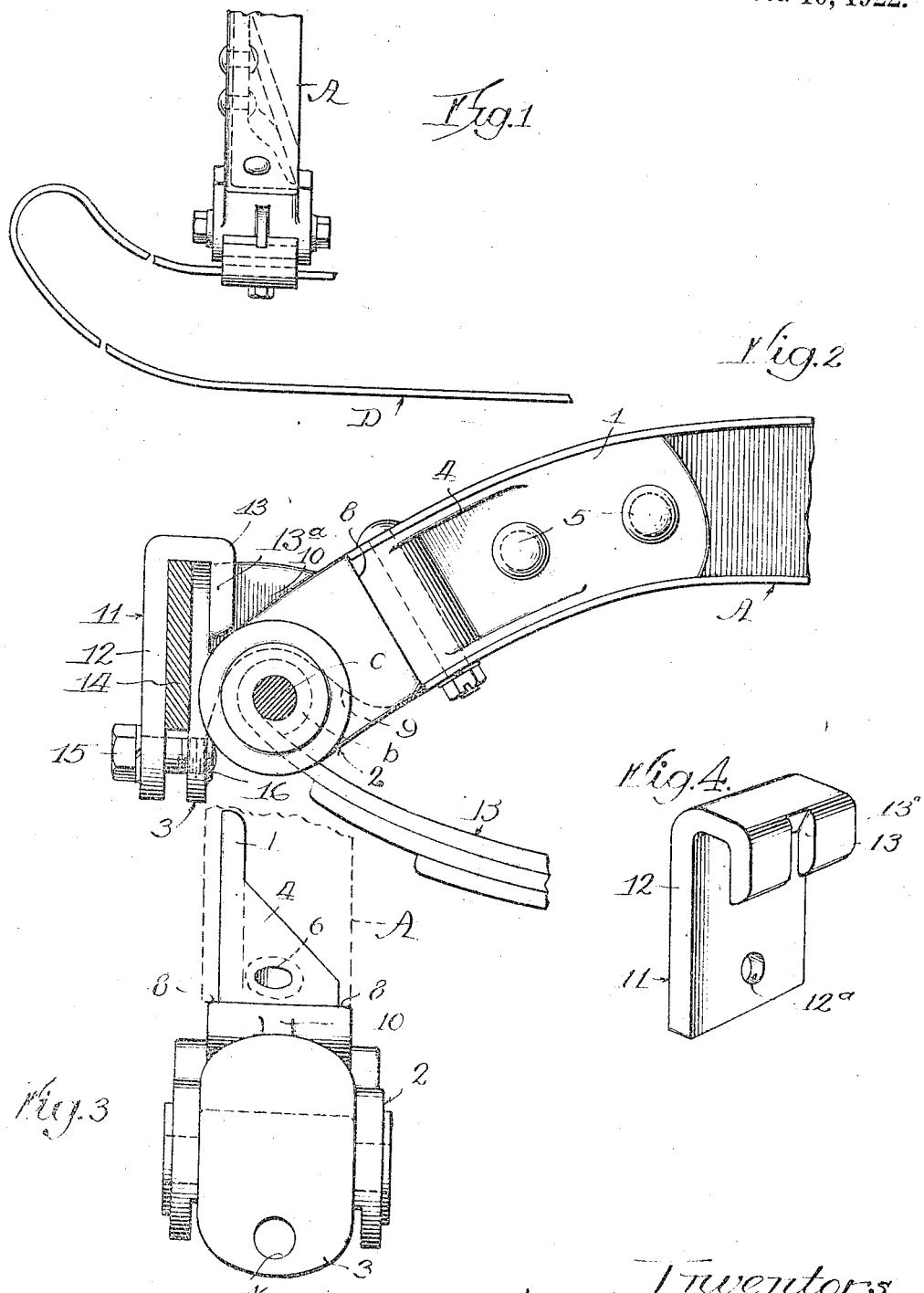

1,431,838

UNITED STATES PATENT OFFICE.

WILLIAM G. PANCOAST, OF WILMETTE, AND WILLIAM J. GROTENHUIS, OF CHICAGO, ILLINOIS, ASSIGNORS, BY MESNE ASSIGNMENTS, TO BIFLEX PRODUCTS COMPANY, A CORPORATION OF DELAWARE.

AUTOMOBILE BUMPER-ATTACHING HANGER.

Application filed September 9, 1921. Serial No. 499,474.

*To all whom it may concern:*

Be it known that we, WILLIAM G. PANCOAST and WILLIAM J. GROTENHUIS, both citizens of the United States, and residents of Wilmette and Chicago, respectively, in the county of Cook and State of Illinois, have invented certain new and useful Improvements in Automobile Bumper-Attaching Hangers, of which the following is a specification.

This invention relates to improvements in automobile bumper attaching hanger designed to be built into the frame of an automobile, and comprising as an integral part thereof a member to which the bumper may be directly attached.

The object of the invention is to provide a hanger in the nature of a metal fitting which will facilitate the mounting of bumpers upon automobiles, and in such a manner as to treat the bumper as a standard and fixed member rather than as an accessory to be applied or not as the whim of the owner dictated. At the present time, the actual protective value of a bumper is rapidly approaching universal recognition, and it follows, therefore, that it is desirable to simplify and standardize the method of attachment of such bumpers, making them more nearly an integral part of the automobile by eliminating the usual clamps and brackets and other comparatively insecure devices for attaching the same to the frame members.

A further object of the invention is to provide a fitting to which a bumper may be directly attached, and yet so designed as not to present an unsightly appearance in the absence of a bumper.

The construction of a hanger will now be described in detail, and with reference to the accompanying drawings, in which a preferred form of fitting is illustrated as follows:

Figure 1 is a top plan view of the forward end of a frame member of an automobile, and equipped with a hanger, and a bumper attached thereto;

Figure 2 is an enlarged view in side elevation of a single hanger.

Figure 3 is a view in front elevation of the hanger without a bumper attached, and Figure 4 is a perspective view of a bumper attaching clip.

The usual practice in automobile frame construction is to provide at the front ends of the longitudinal frame members A—A an integral head to which the forward end of the spring B is connected by means of a spring bolt C just as shown in Figure 1. In equipping an automobile with a hanger constructed in accordance with the invention, the frame members are cut just short of the usual head which supports the end of the spring, and a complete bumper attaching hanger is secured, which includes in a single integral member a shank 1 by which the hanger is joined to the frame member, a head serving the same purpose as the corresponding part eliminated, and finally the bumper attaching portion 3 especially designed to receive the parts acting to connect the bumper proper to the fitting. As already suggested, the parts 1, 2 and 3 are formed in a single metal casting or forging and preferably applied by the use of rivets or other means of permanent connection.

The shank 1 extends longitudinally inward from the end of the channel shaped frame member 1 fitting within the slightly tapered end portion thereof, and consisting of a vertical plate bearing flatwise against the vertical web of the frame member, and provided with integral transverse reinforcing webs 4—4 adjacent the longitudinal edges thereof, and tapering from front to rear. A suitable number of rivets 5—5 extend through the shank and the vertical web of the frame member, as well as a rivet 6 extending transversely through the horizontal webs near the end of the frame members, and an enlarged portion 7 at the forward end of the shank 1. The head 2 projects immediately beyond the end of the frame member A and consists of a body having shoulders 8—8 abutting against the end of the frame members, and a large cavity 9 opening downwardly and adapted to house the end of the spring B. The spring bolt C passes transversely through the head engaging an eye *b* formed at the end of the spring B.

Immediately forward of the head is the bumper attaching portion 3, consisting of an integral and vertically disposed plate extending above and below the head at substantially equal distances. The upper portion of the plate is reinforced by a vertical web 10 extending between the rear face of the plate and the upper portion of the head. The plate is rectangular in shape and slightly elongated in a vertical direction with the upper and lower edges rounded as shown in Figure 2 in order to provide a more pleasing appearance in the absence of a bumper.

The function of the plate is to form an abutment for the bumper, and a connection for the attaching member which has the form of a U-shaped clip 11 having a long and a short leg 12 and 13, the former passing downwardly in front of and below the bar 14 forming the rearwardly disposed portion of the bumper D and the latter engaging over the upper edge of the plate 3 in the manner of a hook. The short leg 13 is provided also with a slot 13ª which engages the reinforcing web 10, and acting to secure the clip in place.

As clearly shown in Figure 2, the clip 11 clamps the bar 14 flatwise against the face of the plate 3, and is itself connected to the plate by means of the hooked connection before described, and further by means of a cap screw 15 which passes through a drilled hole 12ª in the lower portion of the clip and a tapped hole 16 in the corresponding portion of the plate 3.

An automobile equipped with such a hanger at the forward end of each frame member A may have a bumper quickly and easily attached at any time, and yet in the absence of the bumper, the attaching member of the hanger; namely, the plate 3, is not objectionable, inasmuch as its size and shape would not detract from the general appearance of the automobile; in fact, it would be scarcely noticeable.

The primary advantage of a hanger of this character is obviously to provide the automobile with an integral port or fixture to which a bumper can be directly attached without altering, cutting or mutilating the frame members in any way, or the use of clamping members secured thereto. The bumper thus becomes an integral and standard part of the automobile without the attendant difficulties that are usually experienced in attaching bumpers without any special provision for doing so.

The novel features of the invention are further set forth in the appended claims wherein we claim:

1. A hanger of the character described, comprising a shank adapted for permanent connection with the end of an automobile frame member, a head beyond the end of said frame member, a plate integral with said head and forming an abutment for a bumper, and a clip adapted to hook over one edge of the plate and to be secured at the other edge of said plate.

2. A hanger of the character described, comprising a shank portion adapted to be permanently fixed in the end of an automobile frame member, a head beyond said shank portion, and an integral abutment plate at the forward end of said head, a bumper attaching clip having a hooked portion along one edge adapted to engage the upper edge of said plate, and means for securing the plate to the lower edge of said plate.

3. A hanger of the character described, comprising a shank portion adapted to be permanently fixed in the end of an automobile frame member, a head beyond said shank portion, a vertical abutment plate integral with said head, an integral web extending transversely between said head and plate, and a bumper attaching clip adapted to hook over one edge of said plate and slotted to engage said web against displacement.

4. A hanger of the character described, comprising a shank portion adapted to be permanently fixed in the end of an automobile frame member, a head projecting beyond the end of said frame member, a vertical abutment plate integral with said head, and provided with a transverse reinforcing web between said plate and head, and a bumper attaching clip adapted to hook over one edge of said plate, and provided with a marginal slot adapted to engage said web, and a screw passing through the free end of said clip and anchored in the opposite end portion of said plate.

In witness whereof, we hereunto subscribe our names this 7th day of Sept. A. D. 1921.

WILLIAM G. PANCOAST.
WILLIAM J. GROTENHUIS.